US012603295B2

(12) United States Patent
Luo

(10) Patent No.: US 12,603,295 B2
(45) Date of Patent: Apr. 14, 2026

(54) COMPOSITE CATHODE PARTICLE BASED ON TERNARY OXIDE FOR ELECTROCHEMICAL BATTERY

(71) Applicant: Zhi Feng Luo, Shenzhen (CN)

(72) Inventor: Zhi Feng Luo, Shenzhen (CN)

(73) Assignee: Shenzhen TXD Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/792,570

(22) Filed: Aug. 2, 2024

(65) Prior Publication Data

US 2026/0038838 A1 Feb. 5, 2026

(51) Int. Cl.
| | |
|---|---|
| *H01M 4/62* | (2006.01) |
| *C01G 53/44* | (2025.01) |
| *H01M 4/36* | (2006.01) |
| *H01M 4/505* | (2010.01) |
| *H01M 4/525* | (2010.01) |
| *H01M 4/02* | (2006.01) |

(52) U.S. Cl.
CPC ............ *H01M 4/628* (2013.01); *C01G 53/44* (2013.01); *H01M 4/366* (2013.01); *H01M 4/505* (2013.01); *H01M 4/525* (2013.01); *H01M 4/625* (2013.01); *C01P 2002/50* (2013.01); *C01P 2004/61* (2013.01); *C01P*

*2004/86* (2013.01); *C01P 2006/40* (2013.01); *H01M 2004/021* (2013.01); *H01M 2004/028* (2013.01)

(58) Field of Classification Search
CPC .............................. H01M 4/505; H01M 4/525
See application file for complete search history.

(56) References Cited

FOREIGN PATENT DOCUMENTS

| | | | | | |
|---|---|---|---|---|---|
| CN | 14551876 A | * | 5/2022 | ............ | H01M 4/525 |
| WO | WO 2023052836 A1 | * | 6/2023 | .............. | H01M 4/36 |

* cited by examiner

*Primary Examiner* — Khanh T Nguyen

(57) ABSTRACT

A composite cathode particle based on a ternary oxide for an electrochemical battery, wherein the electrochemical battery is a solid-state battery or semi-solid battery. The composite cathode particle includes a large NCM (lithium nickel manganese cobalt oxide) particle. An outer surface of the large NCM particle is partially or fully enclosed by a glass phase layer. A plurality of small LLZO particles are dispersed within the glass phase layer or on an outer surface of the glass phase layer. The large NCM particle, the glass phase layer and the small LLZO particles form a composite NCM particle. Each of the small LLZO particles is formed by a LLZO ($Li_7La_3Zr_2O_{12}$) or a LLZO doped with at least one metal. An outer surface of the composite NCM particle is wrapped by a plurality of first carbon nanotubes and filled by a plurality of nanoscale amorphous carbons.

14 Claims, 5 Drawing Sheets

COMPOSITE CATHODE PARTICLE BASED ON TERNARY OXIDE FOR ELECTROCHEMICAL BATTERY

FIELD OF THE INVENTION

The present invention is related to a cathode material of a battery, and in particular to a composite cathode particle based on a ternary oxide for an electrochemical battery.

BACKGROUND OF THE INVENTION

A battery is mainly formed by the positive and negative electrodes placed in the electrolyte. The positive electrode is made by mixing and dispersing a large number of positive conductive units (positive electrode material, such as lithium cobalt oxide) in a slurry. The positive conductive units must be mixed with the conductive slurry before being applied to the electrode sheet and assembled into the battery. The positive conductive units are connected to each other through the conductive slurry. Therefore, the conductive slurry must have enough conductivity in order to enable free electrons to migrate in different positive conductive units and do not have to consume too much energy due to the internal resistance, which achieves the purpose of effective conductivity. As a result, it is necessary to use a specific conductive material to make the slurry to adjust the conductivity.

In order to increase the conductivity, the positive electrode slurry is filled with a plurality of positive electrode particles which may be formed by NCM (lithium nickel manganese cobalt oxide), LMFP (lithium manganese iron phosphate), or mixtures thereof. The positive electrode particles are dispersed within the positive electrode slurry. However, in prior arts, the interface of the positive electrode particles is prone to produce side reactions that reduce the lifespan of the positive electrode and lower the electronic conductivity, so the overall battery performance is also poor.

SUMMARY OF THE INVENTION

Accordingly, for improving above mentioned defects in the prior art, the object of the present invention is to provide a composite cathode particle based on a ternary oxide for an electrochemical battery, wherein an outer surface of the large NCM particle is enclosed by a glass phase layer. The glass phase layer serves to block a direct contact between the large NCM particle and the electrolyte of the battery and reduce the interface side reaction. The glass phase layer serves to reduce an interface impedance of lithium ions entering and exiting the large NCM particle and improve a charge-discharge rate performance. The glass phase layer also serves to accommodate a volumetric change of a charging and discharging and improve mechanical properties of the large NCM particle, and reduce the fragmentation. The small LLZO particles dispersed on the glass phase layer have the ability of accommodating and guiding the lithium ions. When the lithium ions pass through the positive electrode, conducting paths of the lithium ions are dispersed by the guiding of the dispersed small LLZO particles, which results in better conducting paths for the lithium ions. The present invention further uses the first carbon nanotubes and nanoscale amorphous carbons to enclose the outer side of the large NCM particle having the small LLZO particles for conducting the electron. The nanoscale amorphous carbons are filled between the first carbon nanotubes to form a more complete electron conduction path. Therefore, the present invention can improve the stability of the positive electrode and reduce the use of cobalt.

To achieve above object, the present invention provides a composite cathode particle based on a ternary oxide for an electrochemical battery, wherein the electrochemical battery is a solid-state battery or semi-solid battery; and the composite cathode particle is used in a positive slurry of a positive electrode inside the electrochemical battery; the composite cathode particle comprising: a large NCM (lithium nickel manganese cobalt oxide) particle; NCM is the ternary oxide; the large NCM particle being a cube having an irregular shape; an outer surface of the large NCM particle being partially or fully enclosed by a glass phase layer; the glass phase layer and the large NCM particle forming a glass-phase-layer-contained NCM particle; the glass phase layer serving to block a direct contact between the large NCM particle and the electrolyte of the battery and reduce an interface side reaction; the glass phase layer serving to reduce an interface impedance of lithium ions entering and exiting the large NCM particle; a plurality of small LLZO particles dispersed within the glass phase layer or on an outer surface of the glass phase layer; the large NCM particle, the glass phase layer and the small LLZO particles forming a composite NCM particle; a size of the large NCM particle being larger than a size of each of the small LLZO particles; each of the small LLZO particles being formed by a LLZO (lithium lanthanum zirconium oxide, $Li_7La_3Zr_2O_{12}$) or a LLZO doped with at least one metal; and wherein the small LLZO particles have a higher lithium ion guiding capability than that of the large NCM particle and do not produce a side reaction with the lithium ions; and when the lithium ions pass through the positive electrode, conducting paths of the lithium ions are dispersed by the guiding of the dispersed small LLZO particles.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
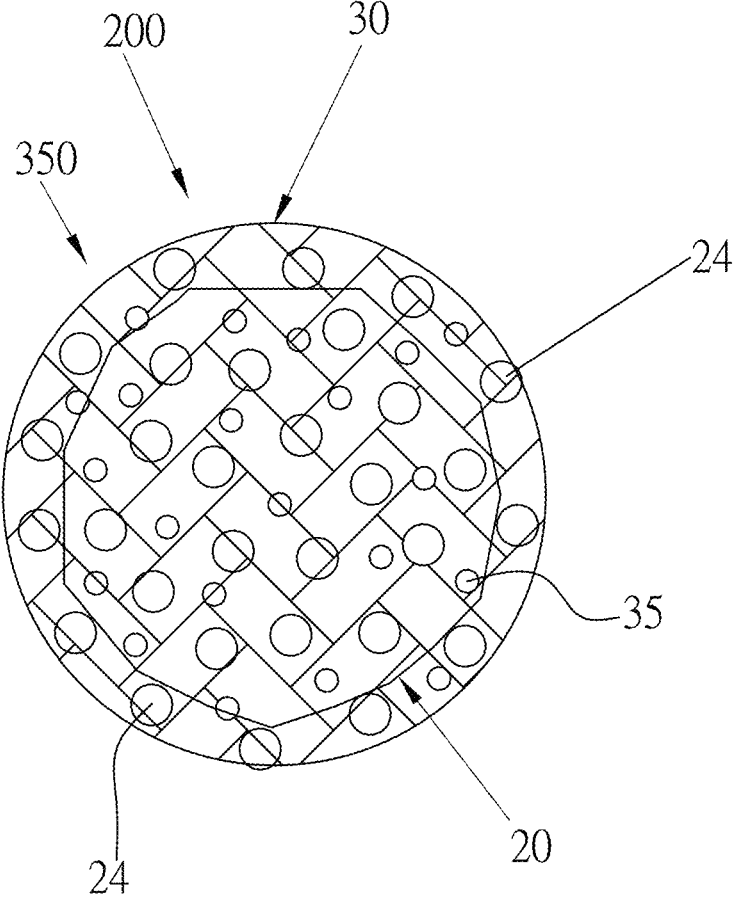
FIG. 1 is a schematic view showing the structure of the composite cathode particle of the present invention.
Figure 2:
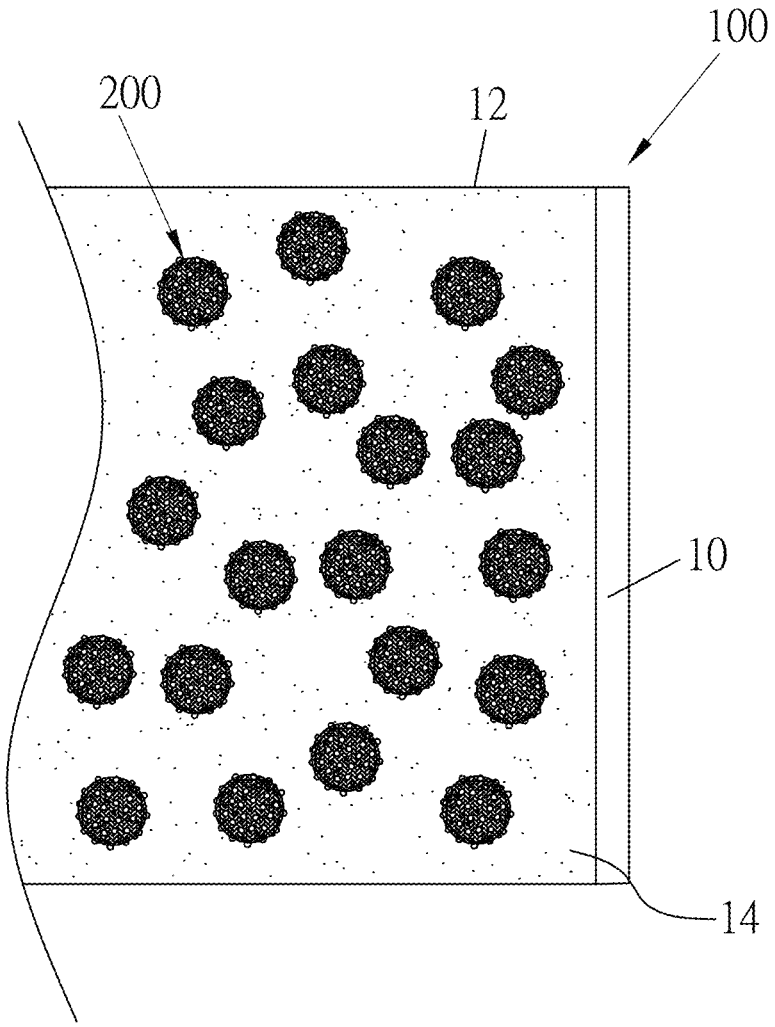
FIG. 2 is a schematic view showing the structure of the positive electrode of the present invention.
Figure 3:
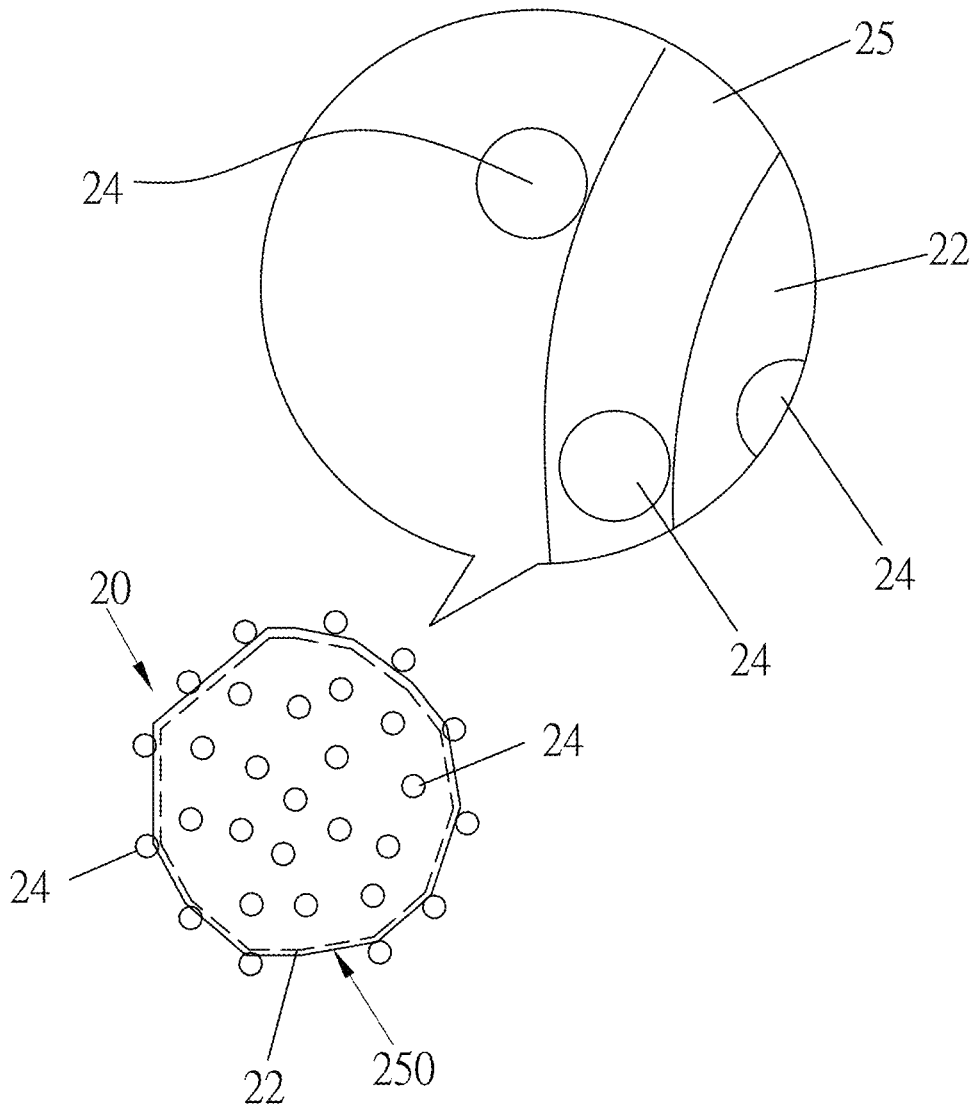
FIG. 3 is a schematic view showing the structure of the composite NCM particle of the present invention.

With reference to FIGS. 1 to 5, the present invention provides a composite cathode particle based on a ternary oxide for an electrochemical battery, wherein the electrochemical battery is in particular a solid-state battery or semi-solid battery. The composite cathode particle is used in a positive (+) electrode 100 inside the electrochemical battery. The positive electrode 100 includes a positive substrate 10 and a positive slurry layer 12 coated on the positive substrate 10. The positive slurry layer 12 includes a plurality of positive electrode particles 200 and a positive slurry 14 with a binder (as shown in FIG. 2). A weight percentage of the positive particles 200 in the positive slurry layer 12 is 92 wt %~98 wt %.

Each of the positive electrode particles 200 is the composite cathode particle of the present invention. The composite cathode particle of the present invention includes the following elements.

A large NCM (lithium nickel manganese cobalt oxide) particle 22. NCM is a ternary oxide. A size of the large NCM particle 22 is 3 μm to 5 μm. The large NCM particle 22 is a single crystal. Referring to FIG. 1, the large NCM particle 22 is a cube having an irregular shape.

An outer surface of the large NCM particle 22 is partially or fully enclosed (coated) by a glass phase layer 25 (preferably fully enclosed/coated). The glass phase layer 25 and the large NCM particle 22 form a glass-phase-layer-contained NCM particle 250. The glass phase layer 25 is formed by a first material which is an amorphous oxide or a non-oxide solid-state electrolyte. A lithium ion conductivity of the first material is higher than $10^{-5}$ S/cm (Siemens per centimeter). The first material is selected from at least one of "an oxide formed by a lithium (Li) and a chemical element in group IIIA (boron group), group IVA (carbon group) or group VA (nitrogen group) of a periodic table" (such as $Li_2O$—$RO_x$, wherein R is selected from at least one of a boron (B), aluminum (Al), silicon (Si), germanium (Ge), phosphorus (P) and arsenic (As), and x=1~3), a lithium halide or lithium oxyhalide (such as Li-M-O, wherein M is selected from at least one of fluorine (F), chlorine (CI), bromine (Br) and iodine (I)), a lithium-contained sulfide (such as $Li_2S$—$P_2S_5$), an amorphous oxide-based solid-state electrolyte (such as an amorphous perovskite solid-state electrolyte (Li—La—Ti—O, lithium lanthanum titanium oxide, LLTO)), a garnet-based solid-state electrolyte (such as Li—La—Zr—O, lithium lanthanum zirconium oxide, LLZO), and a lithium phosphorus oxynitride (LiPON).

A thickness of the glass phase layer 25 is 5 nm~100 nm.

The glass phase layer 25 serves to block a direct contact between the large NCM particle 22 and the electrolyte in the battery and reduce the interface side reaction. The glass phase layer 25 serves to reduce an interface impedance of lithium ions entering and exiting the large NCM particle 22 and improve a rate capability performance. The glass phase layer 25 also serves to accommodate a volumetric change of a charging and discharging and improve mechanical properties of the large NCM particle 22, and reduce the fragmentation.

A plurality of small LLZO particles 24 are dispersed within the glass phase layer 25 or on an outer surface of the glass phase layer 25. The large NCM particle 22, the glass phase layer 25 and the small LLZO particles 24 form a composite NCM particle 20. The size of the large NCM particle 22 is larger than a size of each of the small LLZO particles 24. Each of the small LLZO particles 24 is formed by a LLZO (lithium lanthanum zirconium oxide, $Li_7La_3Zr_2O_{12}$) or a LLZO doped with at least one metal. The LLZO doped with at least one metal may be a gallium (Ga)-doped LLZO ($Li_{6.2}Ga_{0.8}La_3Zr_2O_{12}$), an aluminum (Al)-doped LLZO or a barium (Ba)-doped LLZO. A horizontal size of each of the small LLZO particles 24 is 50 nm~300 nm, which is a size of the small LLZO particle 24 on a horizontal direction corresponding to a spherical surface of the large NCM particle 22. The small LLZO particles 24 are coated on the large LCO particle 22 by using a sintering. After the sintering, a vertical size of each of the small LLZO particles 24 is decreased, wherein the vertical size of the small LLZO particle 24 is a size on a direction perpendicular to the horizontal direction corresponding to the spherical surface of the large NCM particle 22. The horizontal size of each of the small LLZO particles 24 is increased and a volume of each of the small LLZO particles 24 remains unchanged.

In the composite NCM particle 20, a ratio of a total weight of the small LLZO particles 24 and a weight of glass-phase-layer-contained NCM particle 250 is 0.2%~2%.

The small LLZO particles 24 have a higher lithium ion guiding capability than that of the large NCM particle 22 and do not produce a side reaction with lithium ions. Therefore, when the lithium ions pass through the positive electrode 100, conducting paths of the lithium ions are dispersed by the guiding of the dispersed small LLZO particles 24, which results in better conducting paths for the lithium ions and increases the battery performance and the lifespan of the battery.

Preferably, each of the small LLZO particles 24 is formed by at least one of a LLZO ($Li_7La_3Zr_2O_{12}$), a Ga-LLZO (gallium-doped LLZO), a Cu-LLZO (copper-doped LLZO), a Ta-LLZO (tantalum-doped LLZO), a Sr-LLZO (strontium-doped LLZO) and an Al-LLZO (aluminum-doped LLZO).

Preferably, each of the small LLZO particles 24 is formed by a $Cu_a$, $X_b$-LLZO, which is a LLZO doped with copper (Cu) and a metal X, wherein X is selected from gallium (Ga), tantalum (Ta), strontium (Sr), barium (Ba) and aluminum (Al), and a>0 and b>0. Preferably, a+b=0.25~0.8 and a>0.1. Doping the copper in the LLZO is technically difficult, but $Cu_a$, $X_b$-LLZO can stabilize an overall structure of the composite NCM particle 20, smooth the channels for lithium ions, and increase a speed of the sintering, which makes the cost more cheaper. It also reduces the producing of lithium carbonate ($Li_2CO_3$) when the small LLZO particles 24 is exposed to the air, which increases the surface stability of the small LLZO particles 24 during the sintering.

The large NCM particle 22 and each of the small LLZO particles 24 have a crystal structure, which has a good stability and will not be easily released or dissociated, so it can increase the battery voltage.

Figure 4:
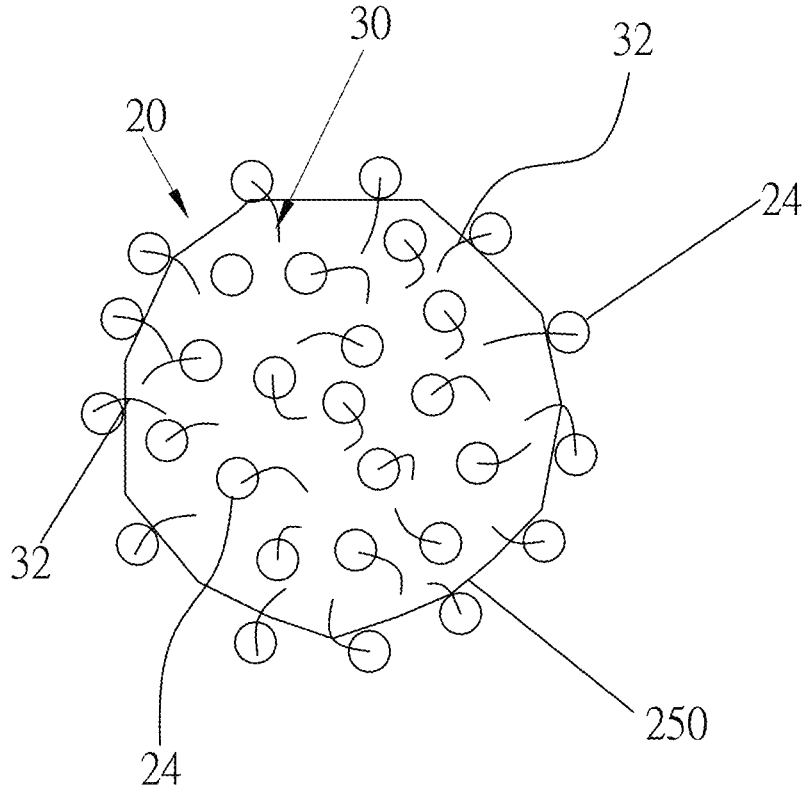
FIG. 4 is a schematic view showing the structure of the composite NCM particle and the short chain carbon nanotubes of the present invention.
Figure 5:
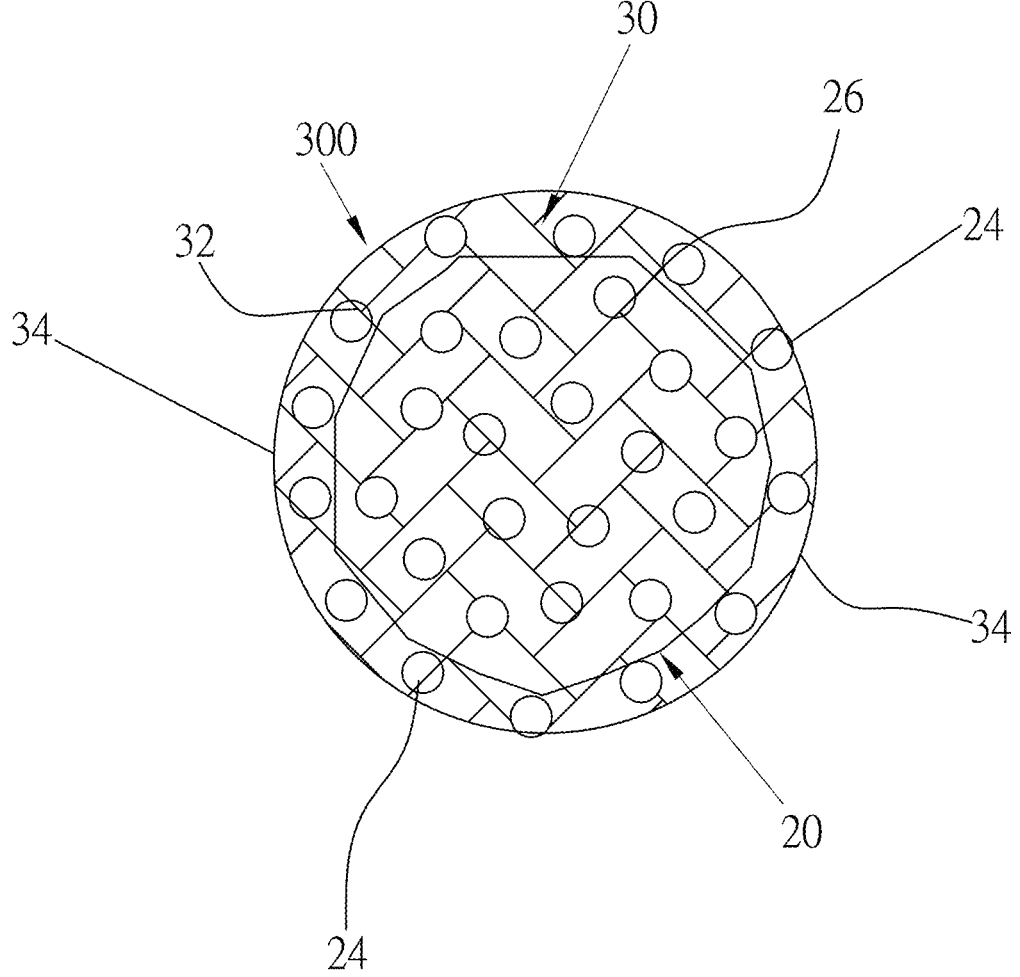
FIG. 5 is a schematic view showing the structure of the carbon-nanotube-contained positive electrode particle of the present invention.

Referring to FIGS. 4 and 5, an outer surface of the composite NCM particle 20 is wrapped by a plurality of first carbon nanotubes 30. The composite NCM particle 20 is wrapped by the first carbon nanotubes 30 to form a carbon-nanotube-contained positive electrode particle 300.

The first carbon nanotubes 30 include a plurality of short chain carbon nanotubes 32 and a plurality of long chain carbon nanotubes 34. A length of each of the short chain carbon nanotubes 32 is 0.5 μm to 1 μm. A length of each of the long chain carbon nanotubes 34 is 3 μm to 8 μm. A ratio of a total weight of the first carbon nanotubes 30 and a weight of the composite NCM particle 20 is 0.1%~2%.

Referring to FIG. 5, each of the short chain carbon nanotubes 32 is connected across between the respective small LLZO particle 24 and the large NCM particle 22. The long chain carbon nanotubes 34 enclose the composite NCM particle 20 to enhance a structural strength of the composite NCM particle 20. A carbon nanotube is a very good conductive material, which increases the electrical conductivity of the entire positive electrode 100. The small LLZO particles 24 serve to increase a conductivity of lithium ions.

The first carbon nanotubes 30 serve to increase the electrical conductance of the electron by forming a plurality of conductive bridges between the small LLZO particles 24 for conducting the electron on the composite NCM particle 20. The first carbon nanotubes 30 have an extremely high electrical conductivity, so that the lithium ions can pass through the first carbon nanotubes 30 and conduct between the small LLZO particles 24 and the large NCM particle 22, which increases the electrical conductivity of the positive electrode 100. The first carbon nanotubes 30 have various lengths to form a plurality of connections with different spanning lengths on the composite NCM particle 20, which increases the conductivity of the positive electrode 100.

The advantages of the first carbon nanotubes 30 are that the lithium ions are easy to be stabilized between the first carbon nanotubes 30, therefore the positive slurry layer 12 can be used to stable the lithium ions and electron between the short chain carbon nanotubes 32 and the long chain carbon nanotubes 34 to increases the lithium ion conductivity. The very high lithium ion conductivity helps the whole battery to charge and discharge quickly. In addition, the use of cobalt also can be reduced, so that the overall production cost can be reduced.

A plurality of nanoscale amorphous carbons 35 are filled (coated) on an outer side of the carbon-nanotube-contained positive electrode particle 300. The nanoscale amorphous carbons 35 and the carbon-nanotube-contained positive electrode particle 300 form a carbon-material-contained positive electrode particle 350. The nanoscale amorphous carbons 35 are filled in a plurality of gaps of an interleaving structure formed by the first carbon nanotubes 30. Preferably, the nanoscale amorphous carbons 35 are amorphous carbons of a Super P auxiliary agent. A size of each of the nanoscale amorphous carbons 35 is 20 nm~100 nm. A ratio of a total weight of the nanoscale amorphous carbons 35 and the weight of the composite NCM particle 20 is 0.1%~2%. The first carbon nanotubes 30 and the nanoscale amorphous carbons 35 are used as an auxiliary agent. Because the nanoscale amorphous carbons 35 are in a form of particles, and the first carbon nanotubes 30 are in a form of long strips, the gaps are formed in the interleaving structure formed by the first carbon nanotubes 30 and are unable to conduct the electric current. Therefore, the nanoscale amorphous carbons 35 is filled in the gaps to transmit the electric charge the first carbon nanotubes 30 through the spanning of the nanoscale amorphous carbons 35, which further increases the transmitting efficiency of the electric current.

A ratio of a total weight of the first carbon nanotubes 30 and the nanoscale amorphous carbons 35 and the weight of the composite NCM particle 20 is (0.09~3):100.

A ratio of a total weight of the first carbon nanotubes 30, a total weight of the nanoscale amorphous carbons 35, and the weight of the composite NCM particle 20 is 0.5:1:100.

With above structure, the positive electrode 100 can withstand more lithium ions, so that the positive electrode 100 can withstand a larger voltage. For example, for an original 4.3V battery, the voltage can be increased from 4.3V to 4.5V by applying the structure of the present invention.

The advantages of the present invention are that an outer surface of the large NCM particle is enclosed by a glass phase layer. The glass phase layer serves to block a direct contact between the large NCM particle and the electrolyte of the battery and reduce the interface side reaction. The glass phase layer serves to reduce an interface impedance of lithium ions entering and exiting the large NCM particle and improve a charge-discharge rate performance. The glass phase layer also serves to accommodate a volumetric change of a charging and discharging and improve mechanical properties of the large NCM particle, and reduce the fragmentation. The small LLZO particles dispersed on the glass phase layer have the ability of accommodating and guiding the lithium ions. When the lithium ions pass through the positive electrode, conducting paths of the lithium ions are dispersed by the guiding of the dispersed small LLZO particles, which results in better conducting paths for the lithium ions. The present invention further uses the first carbon nanotubes and nanoscale amorphous carbons to enclose the outer side of the large NCM particle having the small LLZO particles for conducting the electron. The nanoscale amorphous carbons are filled between the first carbon nanotubes to form a more complete electron conduction path. Therefore, the present invention can improve the stability of the positive electrode and reduce the use of cobalt.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A composite cathode particle based on a ternary oxide for an electrochemical battery, wherein the electrochemical battery is a solid-state battery or semi-solid battery; and the composite cathode particle is used in a positive slurry of a positive electrode inside the electrochemical battery; the composite cathode particle comprising:

a large NCM particle; NCM is the ternary oxide; the large NCM particle being a cube having an irregular shape; where NCM is lithium nickel manganese cobalt oxide;

an outer surface of the large NCM particle being partially or fully enclosed by a glass phase layer; the glass phase layer and the large NCM particle forming a glass-phase-layer-contained NCM particle; the glass phase layer serving to block a direct contact between the large NCM particle and the electrolyte of the battery and reduce an interface side reaction; the glass phase layer serving to reduce an interface impedance of lithium ions entering and exiting the large NCM particle;

a plurality of small LLZO particles dispersed within the glass phase layer or on an outer surface of the glass phase layer; the large NCM particle, the glass phase layer and the small LLZO particles forming a composite NCM particle; a size of the large NCM particle being larger than a size of each of the small LLZO particles; each of the small LLZO particles being formed by a LLZO or a LLZO doped with at least one metal; where LLZO means lithium lanthanum zirconium oxide with a chemical formula $Li_7La_3Zr_2O_{12}$; and wherein the small LLZO particles have a higher lithium ion guiding capability than that of the large NCM particle and do not produce a side reaction with the lithium ions; and when the lithium ions pass through the positive electrode, conducting paths of the lithium ions are dispersed by the guiding of the dispersed small LLZO particles.

2. The composite cathode particle based on the ternary oxide for the electrochemical battery as claimed in claim 1, wherein the size of the large NCM particle is 3 μm to 5 μm; the large NCM particle is a single crystal; and a thickness of the glass phase layer is 5 nm~100 nm.

3. The composite cathode particle based on the ternary oxide for the electrochemical battery as claimed in claim 1, wherein the glass phase layer is formed by a first material which is an amorphous oxide or a non-oxide solid-state electrolyte; a lithium ion conductivity of the first material is higher than 10$^{-5}$ Siemens per centimeter; the first material is selected from at least one of an oxide formed by a lithium and a chemical element in group IIIA, group IVA or group VA of a periodic table, a lithium halide or lithium oxyhalide, a lithium-contained sulfide, an amorphous oxide-based solid-state electrolyte, an amorphous perovskite solid-state electrolyte, a garnet-based solid-state electrolyte, and a lithium phosphorus oxynitride.

4. The composite cathode particle based on the ternary oxide for the electrochemical battery as claimed in claim 1, wherein the glass phase layer is formed by a first material which is an amorphous oxide or a non-oxide solid-state electrolyte; a lithium ion conductivity of the first material is higher than 10$^{-5}$ Siemens per centimeter; the first material is selected from at least one of:

Li-M-O, wherein M is selected from at least one of fluorine, chlorine, bromine and iodine, Li$_2$O—RO$_x$, wherein R is selected from at least one of a boron, aluminum, silicon, germanium, phosphorus and arsenic, and x=1~3, Li—La—Ti—O, Li—La—Zr—O, and Li$_2$S—P$_2$S$_5$; and wherein Li—La—Ti—O means lithium lanthanum titanium oxide and Li—La—Zr—O means lithium lanthanum zirconium oxide.

5. The composite cathode particle based on the ternary oxide for the electrochemical battery as claimed in claim 1, wherein each of the small LLZO particles is formed by at least one of a LLZO, a Ga-LLZO, a Cu-LLZO, a Ta-LLZO, a Sr-LLZO and an Al-LLZO.

6. The composite cathode particle based on the ternary oxide for the electrochemical battery as claimed in claim 1, wherein a horizontal size of each of the small LLZO particles is 50 nm~300 nm, which is a size of the small LLZO particle on a horizontal direction corresponding to a spherical surface of the large NCM particle.

7. The composite cathode particle based on the ternary oxide for the electrochemical battery as claimed in claim 1, wherein in the composite NCM particle, a ratio of a total weight of the small LLZO particles and a weight of glass-phase-layer-contained NCM particle is 0.2%~2%.

8. The composite cathode particle based on the ternary oxide for the electrochemical battery as claimed in claim 1, wherein an outer surface of the composite NCM particle is wrapped by a plurality of first carbon nanotubes; and the composite NCM particle is wrapped by the first carbon nanotubes to form a carbon-nanotube-contained positive electrode particle.

9. The composite cathode particle based on the ternary oxide for the electrochemical battery as claimed in claim 8, wherein the first carbon nanotubes include a plurality of short chain carbon nanotubes and a plurality of long chain carbon nanotubes; a length of each of the short chain carbon nanotubes is 0.5 μm to 1 μm; a length of each of the long chain carbon nanotubes is 3 μm to 8 μm; each of the short chain carbon nanotubes is connected across between the respective small LLZO particle and the large NCM particle; and the long chain carbon nanotubes enclose the composite NCM particle to enhance a structural strength of the composite NCM particle.

10. The composite cathode particle based on the ternary oxide for the electrochemical battery as claimed in claim 8, wherein a ratio of a total weight of the first carbon nanotubes and a weight of the composite NCM particle is 0.1%~2%.

11. The composite cathode particle based on the ternary oxide for the electrochemical battery as claimed in claim 8, further comprising a plurality of nanoscale amorphous carbons are filled on an outer side of the carbon-nanotube-contained positive electrode particle; the nanoscale amorphous carbons and the carbon-nanotube-contained positive electrode particle form a carbon-material-contained positive electrode particle; and the nanoscale amorphous carbons are filled in a plurality of gaps of an interleaving structure formed by the first carbon nanotubes.

12. The composite cathode particle based on the ternary oxide for the electrochemical battery as claimed in claim 11, wherein a size of each of the nanoscale amorphous carbons is 20 nm~100 nm.

13. The composite cathode particle based on the ternary oxide for the electrochemical battery as claimed in claim 11, wherein a ratio of a total weight of the nanoscale amorphous carbons and the weight of the composite NCM particle is 0.1%~2%; and the nanoscale amorphous carbons are used as an auxiliary agent.

14. The composite cathode particle based on the ternary oxide for the electrochemical battery as claimed in claim 11, wherein a ratio of a total weight of the first carbon nanotubes, a total weight of the nanoscale amorphous carbons, and the weight of the composite NCM particle is 0.5:1:100.

* * * * *